US010967603B2

(12) United States Patent
De Schoenmaker et al.

(10) Patent No.: US 10,967,603 B2
(45) Date of Patent: Apr. 6, 2021

(54) SINGLE-SERVE PORTION PACK

(71) Applicant: AMCOR FLEXIBLES TRANSPAC BVBA, Ghent (BE)

(72) Inventors: Bert De Schoenmaker, Oostakker (BE); Tony Malfait, Rollegem-Kapelle (BE); Lieven Plaetinck, Laarne Kalken (BE)

(73) Assignee: Amcor Flexibles Transpac BVBA, Ghent (BE)

( * ) Notice: Subject to any disclaimer, the term of this patent is extended or adjusted under 35 U.S.C. 154(b) by 0 days.

(21) Appl. No.: 16/767,073

(22) PCT Filed: Sep. 27, 2018

(86) PCT No.: PCT/EP2018/076290
§ 371 (c)(1),
(2) Date: May 26, 2020

(87) PCT Pub. No.: WO2019/101399
PCT Pub. Date: May 31, 2019

(65) Prior Publication Data
US 2020/0368991 A1    Nov. 26, 2020

(30) Foreign Application Priority Data

Nov. 27, 2017   (EP) .................................... 17203752

(51) Int. Cl.
*B32B 1/02*     (2006.01)
*B32B 7/12*     (2006.01)
(Continued)

(52) U.S. Cl.
CPC .................. *B32B 1/02* (2013.01); *B32B 7/12* (2013.01); *B32B 27/08* (2013.01); *B32B 27/302* (2013.01); *B32B 27/304* (2013.01); *B32B 27/306* (2013.01); *B32B 27/34* (2013.01); *B32B 27/365* (2013.01); *B65D 1/095* (2013.01);
(Continued)

(58) Field of Classification Search
CPC .. B32B 1/02; B32B 7/12; B32B 27/08; B32B 27/302; B32B 27/304; B32B 27/306; B32B 27/34; B32B 27/365; B32B 2255/26; B32B 2307/31; B32B 2307/54; B32B 2307/738; B32B 2307/75; B32B 2439/70; B65D 1/095; B65D 85/76
See application file for complete search history.

(56) References Cited

U.S. PATENT DOCUMENTS 4,666,778 A    5/1987  Hwo
6,861,125 B1   3/2005  Carlson et al.
(Continued)

FOREIGN PATENT DOCUMENTS

DE    10236730 B4    12/2004
EP     0468864 B2     7/2000
(Continued)

*Primary Examiner* — Michael C Miggins

(57) ABSTRACT

A single-serve portion pack may have a multilayer film structure including a protective layer, a print, a base layer and a peelable seal layer. The print is situated in-between the protective layer and the base layer. The protective layer is a polyalkylene terephthalate based layer having a stress value at 20% strain, at 90° C., comprised between 5 and 20 MPa (preferably between 5 and 15 MPa), and a melting peak temperature comprised between 190 and 240° C. (preferably between 200 and 230° C.).

20 Claims, 2 Drawing Sheets

(51) Int. Cl.
  *B32B 27/08* (2006.01)
  *B32B 27/30* (2006.01)
  *B32B 27/34* (2006.01)
  *B32B 27/36* (2006.01)
  *B65D 1/09* (2006.01)
  *B65D 85/76* (2006.01)
(52) U.S. Cl.
  CPC .......... *B65D 85/76* (2013.01); *B32B 2255/26* (2013.01); *B32B 2307/31* (2013.01); *B32B 2307/54* (2013.01); *B32B 2307/738* (2013.01); *B32B 2307/75* (2013.01); *B32B 2439/70* (2013.01)

(56) References Cited

U.S. PATENT DOCUMENTS

| | | |
|---|---|---|
| 2002/0142115 A1 | 10/2002 | Sugiura |
| 2005/0147812 A1 | 7/2005 | Malfait et al. |
| 2008/0053608 A1 | 3/2008 | Wald et al. |

FOREIGN PATENT DOCUMENTS

| | | |
|---|---|---|
| EP | 1525979 A1 | 4/2005 |
| JP | 9057919 A | 3/1997 |
| WO | 2016200396 A1 | 12/2016 |

# SINGLE-SERVE PORTION PACK

FIELD

The present disclosure is related to single-serve portion packs and in particular to a multilayer film structure with improved characteristics in a particular production process.

INTRODUCTION

For the packaging of portion packs containing liquid or viscous products such as sauce, soft cheese or liquid soap, rigid multilayer sheets of 100 to 500 µm thickness are currently used.

These sheets are generally based on deep-drawable polymers from which indicative examples are polystyrene (PS), polyvinyl chloride (PVC), amorphous polyethylene terephthalate (APET), polypropylene (PP), generally combined with polyethylene (PE) or its copolymers to provide sealing or with polyethylene peel formulations well known by those skilled in the art for easy-opening.

In the case where oxygen barrier properties are needed for shelf-life protection of the product, a gas barrier such as a poly(ethylene vinyl alcohol) (EVOH) layer is included into the structure. Examples of existing multilayer combinations in the prior art are:
 printing/PP/adhesive layer/PE peel
 printing/PVC/adhesive layer/PE peel
 printing/APET/adhesive layer/PE peel
 printing/PS/adhesive layer/PE/tie layer/EVOH/tie layer/PE peel The polymer types used herein are well known by those skilled in the art.

These structures are usually produced by means of adhesive lamination, heat lamination, extrusion coating, co-extrusion or a combination thereof and can be considered as a full entity.

In a final step, the sheets are printed on top of the multilayer entity (PVC, PP, APET or PS)-side in order to provide the customer with relevant information about the packaging product and/or for decorative reasons.

The problem however with outside printing is the risk of direct contact of the ink with the food and the mouth. Since only a limited number of inks are food-approved, which strongly limits the choice of the inks for the converter, direct contact printing implies considerable risk for the end-user, in particular in the case of food packaging.

Another problem with the existing prior-art structures is the processability on high-speed packaging lines producing portion packs at speeds equal or higher than 25 cycles/min. or even at 40 cycles/min. These speeds are difficult to manage for prior-art film structures.

At these speeds, the limiting factor is always the heat transmission into the multilayer sheet. For that reason, high sealing temperatures are used and generally a temperature resistance above 150-160° C. is required. The consequence is that the outside printed layer becomes damaged, resulting in irregular deformations of the film and bad transport on the packaging line.

An additional problem is that during start-stop situations on high-speed packaging lines, where the sheet structure becomes subjected to additional heat, the prior-art structures stick to the heating plates.

The patent literature is very poor on single-serve portion packs and in particular on single-serve portion packs containing liquids and soft food.

JP 9057919 discloses a portion pack with a lid material and a laminated main body. An overprint varnish is applied to protect the printed face. Burning and printing properties are improved.

EP-A-0 468 864 discloses a multilayer film comprising a transparent polyester film, a first ink layer with a protection varnish on a first side of the polyester film, said film further comprising a metal layer applied on the first ink layer, and a second ink layer with a varnish on the metal layer, the film having visible printings on both sides.

US 2008/0053608 discloses a pre-printed rigid thermoformable material that is suitable for use in manufacturing consumer retail packaging. The material includes two rigid thermo-formable layers or films adhered together. Printing is included on either or both of the facing surfaces of the films, so that the printing is protected between the adhered layers. Suitable materials include polyvinylchloride (PVC), polyethylene terephthalate glycol (PETG), amorphous polyethylene terephthalate (APET), recycled polyethylene terephthalate (RPET), polypropylene (PP), or oriented polystyrene (OPS).

U.S. Pat. No. 6,861,125 discloses a flexible, thermosformable packaging film laminate including an outer layer comprising a biaxially oriented polyester film; a layer of ink on a surface of said outer layer; an adhesive layer adjacent said layer of ink; and a flexible polyamide containing coextruded film adhered to said adhesive layer, said polyamide containing coextruded film including an exterior polyolefin layer opposite said biaxially oriented polyester film, wherein said polyolefin layer is an exterior surface layer of said laminate. The film laminate offers an improvement in the thermoforming performance of a register printed packaging film.

EP-A-1 525 979 discloses a one-portion pack, comprising a reverse-printed protective layer, a base layer and a peel layer, said protective layer comprising a crosslinked coating layer on top of the protective layer, said protective layer being selected from polyethylene terephthalate, dimethanol-cyclohexane modified polyethylene terephthalate and polyamide.

Today, single-serve portion packs have attractive designs to pack food-on-the-go (FIG. 1). All sorts of fancy shapes are made with eye-catching color designs and appealing figures for children. The original round egg-type shapes of portion packs become replaced by much more complicated, curved forms and sharp-edged shapes. In small dimensions, these forms and edges put challenging demands on the thermos-formability of the applied thermoplastic sheets.

A strong draw-back of the prior art is the presence of the oriented film for ink protection which has limited capability to be thermoformed. Softer films could be used with less crystallinity but these film show constraints in terms of temperature resistance in the sealing operation. Moreover, these softer films have insufficient dimensional stability in a high-quality printing operation, such as heliographic printing.

SUMMARY

The present disclosure aims to provide a multilayer structure that does not present the drawbacks of the prior art.

A multilayer structure is provided, allowing the production of single-serve portion packs having complicated, curved forms and sharp-edged shapes in combination with a high-quality print, said single-serve portions packs being free of any defect.

Disclosed herein is a single-serve portion pack comprising a multilayer film structure, said multilayer film structure comprising a protective layer, a print, a base layer and a peelable seal layer, said print situated in-between said protective layer and said base layer wherein said protective layer is a polyalkylene terephthalate based layer characterized by a stress value at 20% strain, comprised between 5 and 20 MPa, preferably between 5 and 15 MPa, measured with a controlled stress dynamic mechanical analyzer at 90° C.

Preferred embodiments disclose one or more of the following features:
- the polyalkylene terephthalate is characterized by a melting peak temperature, measured by differential scanning calorimetry, according to ISO 11357, with a heating gradient of 10° C./min., comprised between 190 and 240° C., preferably between 200 and 230° C.;
- the polyalkylene terephthalate is characterized by a melt flow index at 250° C., according to ISO 1133, using a piston actuated by a weight of 2.16 kg, comprised between 5 and 20 g/10 min., preferably between 5 and 15 g/10 min.;
- the polyalkylene terephthalate is selected from the group consisting of polybutylene terephthalate and diacid modified polyethylene terephthalate;
- the peelable seal layer comprises between 1,000 and 4,000 ppm, preferably between 2,000 and 3,000 ppm of a release agent;
- the peelable layer comprises between 5,000 and 10,000 ppm, preferably between 6,000 and 9,000 ppm of a release agent;
- the release agent is a fatty acid ester of a polyhydric alcohol having at least one fatty acid ester radical per polyhydric alcohol, said fatty acid having 18 or more carbon atoms;
- the release agent is selected from the group consisting of glycerol monostearate, glycerol monobehenate, glycerol monolignocerate, glycerol monoarachinate, glycerol monocerotinate and glycerol monooleate;
- the peelable seal layer comprises a barrier layer selected from the group consisting of poly(ethylene vinyl alcohol), polyvinyl alcohol, polyvinylidene chloride, polyamide, polyester and combinations thereof;
- the base layer comprises one or more polymer layer(s) selected from the group consisting of polyamide, polyester, polycarbonate, polyvinyl chloride, polypropylene, polyethylene, polystyrene, polyester-glycol copolymer and ethylene vinyl acetate;
- the multilayer structure comprises an additional layer on top of the protective layer on the other side of print, said additional layer being a crosslinked coating layer;
- the overall thickness of the multilayer film structure is at least 100 μm, preferably at least 150 μm, more preferably at least 200 μm, most preferably at least 250 μm;
- the thickness of the protective layer is comprised between 5 and 60 μm, preferably between 10 and 50 μm, more preferably between 10 and 40 μm;
- the thickness of the peelable seal layer is comprised between 20 and 80 μm, preferably between 30 and 70 μm, more preferably between 30 and 60 μm.

A method is disclosed for the production of the single-serve portion pack comprising the following steps:
a) coextrusion, extrusion lamination, or extrusion-coating, and/or lamination of the base layer, the peelable seal layer, optionally a gas-barrier layer, and tie layer(s);
b) reverse-printing of the protective layer;
c) adhesive lamination of the structure comprising the base layer, the peelable seal layer, the optional gas-barrier layer, and tie layer(s), formed in a) and the protective layer, comprising print, formed in b), the print contacting the base layer, to form the multilayer film structure;
d) thermos-forming the multilayer film structure produced in c) to form a cavity structure;
e) sealing the cavity structure, realised in d), against itself or against another sealable multilayer structure;
the steps a) and b) being separate or simultaneous steps.

In a preferred embodiment of the method, printing in b) is heliographic printing.

The single-serve pack may be used for the packaging of soft cheese, sauce, soap, and similar liquid products.

Figure 1:
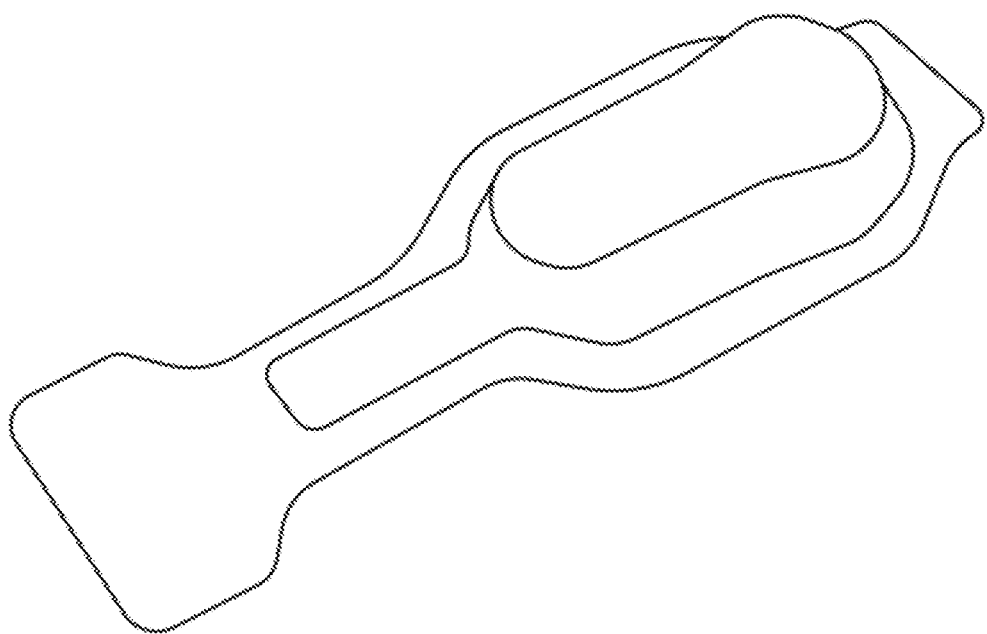
FIG. 1 shows a single-serve portion pack obtained from the multilayer film structure of the present disclosure.
Figure 2:
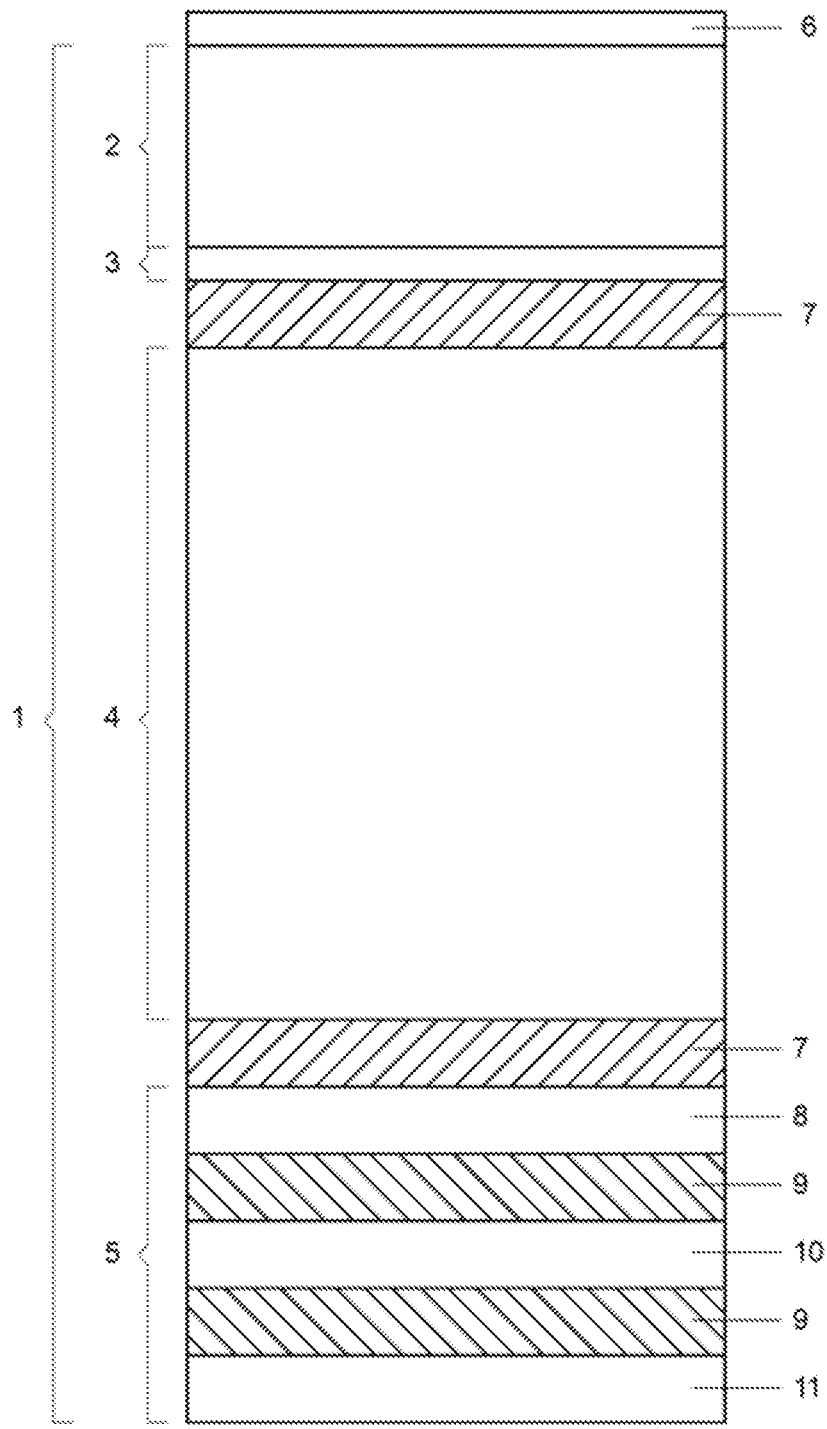
FIG. 2 shows a section through the multilayer film structure in accordance with the present disclosure.

KEY 1. multilayer film structure
2. protective layer
3. print
4. base layer
5 peelable seal layer
6. coating (optional)
7. adhesive layer
8. outside lamination layer of peelable seal film
9. tie layer
10. barrier layer
11 peelable layer

DETAILED DESCRIPTION

The present disclosure provides a multilayer film structure 1 for the production of single-serve portion packages having complicated, curved forms and sharp-edged shapes in combination with a high-quality print, said single-serve portions packs being free of defects such as cracks, color inhomogeneity or out-of-register prints.

The multilayer film structure 1 of the present disclosure comprises a protective layer 2, a base layer 4 and a peelable seal layer 5, wherein:
the protective layer 2 comprises a print 3;
the base layer 4 is sandwiched between the protective layer 2, comprising print 3, and the peelable seal layer 5; and
the print 3 of the protective layer 2 contacts the base layer 4.

The protective layer 2 is a polyalkylene terephthalate based layer characterized by a stress at 20% strain, at 90° C., comprised between 5 and 20 MPa, preferably between 5 and 15 MPa and an elastic modulus, at 25° C. comprised between 2200 and 3300 MPa, preferably between 2400 and 3200 MPa.

Stress-strain curves are measured with a controlled stress TA instruments Q800 dynamic mechanical analyzer, wherein samples of 10 mm length and 5 mm width are clamped in machine direction with a preload force of 0.025 N. After an equilibrium period of 5 minutes at 90° C., a steady force increase of 1 N/min. is applied on the sample until a strain of at least 20% is reached and the resulting strain percentage is recorded.

The elastic modulus is measured according to ASTM D882.

The protective layer 2 further is characterized by a melting peak temperature, measured by differential scanning calorimetry, according to ISO 11357, with a heating gradient of 10° C./min., comprised between 190 and 240° C., preferably between 200 and 230° C.; and a melt flow index at 250° C., according to ISO 1133, using a piston actuated by a specified weight, usually 2.16 kg, comprised between 5 and 20 g/10 min., preferably between 5 and 15 g/10 min.

Multilayer film structures 1 comprising polyalkylene terephthalate based protective layers 2, answering the combined above characteristics, can be thermoformed to complicated, curved forms and sharp-edged shapes without defects;

provide dimensional stability allowing the application of a number of printing layers with sufficient layer thickness for guaranteeing in-register prints and color-depth homogeneity upon thermoforming;

provide temperature resistance during the sealing operation.

The polyalkylene terephthalate based layer is selected from the group consisting of polybutylene terephthalate and diacid modified polyethylene terephthalate.

The diacid of diacid modified polyethylene terephthalate is selected from the group consisting of isophthalic acid, 2,6-naphthalenedicarboxylic acid and mixtures thereof.

The diacid modified polyethylene terephthalate comprises from 1 to 40% by mole of isophthalate and/or 2,6 naphthalenedicarboxylate polyester units and from 99 to 60% by mole of terephthalate polyester units; preferably, the modified polyethylene terephthalate comprises from 5 to 20% by mole of isophthalate and/or 2,6 naphthalenedicarboxylate polyester units and from 95 to 80% by mole of terephthalate polyester units.

Preferably, the protective layer (2) is a polybutylene terephthalate based layer.

The print 3 on the protective layer 2 may be obtained from a conventional printing process, such as for example offset printing, flexography, rotogravure or a digital printing process.

The print 3 on the protective layer 2 preferably is obtained from flexography and rotogravure printing processes, and is more preferably obtained from rotogravure.

The ink compositions to be used in the present disclosure are dryable and/or curable and are solvent-containing, water-based or solvent-less inks comprising one or more polymer(s) and/or oligomers selected from the group consisting of polyolefins, poly(meth)acrylics, styrene-(meth)acrylic copolymers, polyesters, polyamides, polyvinyl chloride, latex, polycarbonates, polyurethanes, polyethers, alkyd resins, rosin resins, maleic resins, hydrocarbon resins, nitrocellulose, polyvinyl butyral, and mixtures thereof; and one or more dyes and/or pigments.

By "curable ink composition", the present disclosure means cross-linking under the influence of heat or under the influence of actinic radiation.

The base layer 4 comprises one or more polymer layer(s) selected from the group consisting of polyamide, polyester, polycarbonate, polyvinyl chloride, polypropylene, polyethylene, polystyrene, polyacrylonitrile, polyester-glycol copolymer and ethylene vinyl acetate.

Preferably, the base layer 4 comprises one or more polymers selected from the group consisting of polyethylene, polypropylene, polyethylene terephthalate, polyamide, polystyrene and polylactic acid.

One side of the base layer 4 is adhesively laminated to the printed protective layer 2, the print 3 being in contact with the base layer 4; the other side of the base layer 4 is adhesively laminated to the peelable seal layer 5.

The surfaces for adhesive lamination in general are plasma treated, preferably corona plasma treated.

The adhesive layer 7 is obtained from an adhesive selected from the group consisting of polyurethane dispersions, acrylic emulsions, water-based polyvinyl alcohol, vinyl acetate copolymers, modified polyolefins, polyesters, synthetic or natural rubber, solvent-based acrylics, one or two component solvent-based polyurethanes and radiation-curable adhesives.

Preferably, the adhesive layer 7 is obtained from a solvent-based polyurethane adhesive.

The peelable seal layer 5 comprises a polyolefin selected from the group consisting of polyethylene homopolymer, propylene homopolymer, 1-butylene homopolymer, an ethylene copolymer, a propylene copolymer, a 1-butylene copolymer and mixtures thereof, the co-monomers of the ethylene copolymers being selected from the group consisting of vinylacetate, methyl acrylate, C3-C8 alpha olefins, and mixtures thereof;

the co-monomers of the propylene copolymers being selected from the group consisting of vinylacetate, methyl acrylate, ethylene, C4-C8 alpha olefins, and mixtures thereof;

the comonomers of the 1-butylene copolymers being selected from the group consisting of vinylacetate, methyl acrylate, ethylene, propylene, C5-C8 alpha olefins, and mixtures thereof.

The peelable seal layer 5 usable in the multilayer structure of the present invention is for example disclosed in U.S. Pat. No. 4,666,778 and US 2005/0147812.

The peelable seal layer 5 optionally comprises a barrier layer 10, preferably a gas barrier layer, said barrier layer 10 comprising a polymer selected from the group consisting of poly(ethylene vinyl alcohol), polyvinyl alcohol, polyvinylidene chloride, polyamide, polyester and combinations thereof, optionally in a mixture with a polyurethane resin and an inorganic layered mineral.

The inorganic layered mineral is preferably an inorganic compound wherein very thin unit crystal layers are superposed to form one lamellar particle, such as phyllosilicates including kaolinite clay minerals, antigorite clay minerals, smectite clay minerals, vermiculite clay minerals and micas or mica clay minerals.

The optional barrier layer 10 is preferably poly (ethylene vinyl alcohol) or polyvinyl alcohol.

For a peelable seal layer 5 comprising a barrier layer 10, said barrier layer 10 is sandwiched between tie layers 9, being transition layers between both, the peelable layer 11 and the outside lamination layer 8.

The tie layers 9 preferably comprise a modified C2-C8 polyolefin, (co)polymer preferably a modified polyethylene or a modified polypropylene.

The expressions "modified polyethylene", "modified polypropylene" and "modified C2-C8 polyolefin (co)polymer" have to be understood as polyethylene, polypropylene or C2-C8 polyolefin (co)polymer modified with functional groups preferably obtained from the incorporation of one or more components selected from the group consisting of maleic anhydride, vinylacetate, vinylalcohol, acrylic acid, methacrylic acid, alkyl acrylate, alkyl methacrylate and mixtures thereof.

The modified polyethylene, polypropylene and C2-C8 polyolefin (co)polymer are preferably maleic anhydride modified polyethylene, maleic anhydride modified polypropylene and maleic anhydride modified C2-C8 polyolefin (co)polymer.

Preferably, the tie layers 9 are maleic anhydride modified polyethylene or maleic anhydride modified polypropylene.

In order to prevent as effectively as possible, and preferably permanently, the adhesion of fatty and especially pasty food products to the interior of the single-serve portion packs, a release agent may be incorporated into the peelable seal layer (5).

The release agent, which aim it is to prevent the adhesion of the packaged foods to the packaging, is a fatty acid ester of a polyhydric alcohol, that is a mono-, di- or if appropriate triester of a mono-, di- or triol. Preference is given to the use of the monoester, in particular of glycerol. The fatty acid radical preferably has at least 18 carbon atoms. In preferred embodiments, the esters with C18 to C30 fatty acid radicals are provided, more preferably with C18 to C26 fatty acid radicals. Especially, preferred embodiments include stearate (C18), oleate (C18), arachinate (C20), behenate (C22), lignocerate (C24) and cerotinate (C26).

The release agent incorporated in the peelable seal layer 5 of the multilayer film structure 1 of the present disclosure preferably is glycerol monostearate or glycerol monobehenate.

Preferably, the release agent is incorporated in the food-facing layer, i.e the peelable layer 11 of the peelable seal layer 5, while the outside lamination layer 8 facing the base layer 4 is release agent-free.

The peelable seal layer 5 comprises between 1,000 and 4,000 ppm, preferably between 2,000 and 3,000 ppm of release agent.

The peelable layer 11 comprises between 5,000 and 10,000 ppm, preferably between 6,000 and 9,000 ppm of release agent.

The peelable layer 11 comprises between 5,000 and 10,000 ppm, preferably between 6,000 and 9,000 ppm of a release agent, said release agent preferably being a mono fatty acid ester of a polyhydric alcohol, said fatty acid having 18 or more carbon atoms, said release agent more preferably being glycerol monostearate or glycerol monobehenate.

The multilayer film structure 1 of the present disclosure may further comprise a crosslinked coating layer 6, generally provided for aesthetic reasons, such as a matt or high-glossy aspect or soft touch feel, and if required for providing additional protection.

The crosslinked coating layer 6 in general is based on resins selected form the group consisting of polyurethane, polyether, polyester, polyamide, polyvinyl acetate, (meth) acrylic (co)polymer, epoxy resins, nitro cellulose, cellulose acetate-propionate, cellulose acetate-butyrate and mixtures thereof.

By "crosslinking", the present disclosure means oxygen crosslinking, moisture crosslinking, peroxide-based radical crosslinking, radical crosslinking initiated by actinic irradiation, cationic crosslinking initiated by actinic irradiation, and crosslinking through the reaction of co-reactable functional groups including self-condensation.

Preferably, crosslinking of the optional coating layer 6 is temperature-activated or initiated by actinic irradiation.

By "thermally activated", the present disclosure means that the conversion proceeds at room temperature or higher temperature within a reasonable time frame, compatible with the overall production process of the multilayer film sequence.

By "actinic irradiation", the present disclosure means ultraviolet (UV) and electron beam (EB) irradiation.

The coating layer 6 is applied according to methods well-known by those skilled in the art such as spray or roller coating.

The overall thickness of multilayer film structure 1 is at least 100 μm, preferably at least 150 μm, more preferably at least 200 μm, most preferably at least 250 μm.

The thickness of the protective layer 2 is comprised between 5 and 60 μm, preferably between 10 and 50 μm, more preferably between 10 and 40 μm.

The thickness of the peelable seal layer 5 is comprised between 20 and 80 μm, preferably between 30 and 70 μm, more preferably between 30 and 60 μm.

The layer thickness of the print 3 is comprised between 0.5 and 5 μm, preferably between 0.5 and 4 μm, more preferably between 0.8 and 3 μm.

The single-serve portion package can be manufactured using methods known in the art.

Preferably, the single-serve portion pack is prepared in a multiple-step process comprising:

a) coextrusion, extrusion lamination, or extrusion-coating, and/or lamination of the base layer 4, the peelable seal layer 5 optionally comprising a gas-barrier layer 10 and tie layer(s) 9;

b) reverse-printing of the protective layer 2;

c) adhesive-lamination of the structure comprising the base layer 4, the peelable seal layer 5, the optional gas-barrier layer 10 and the tie layer(s) 9, formed in a) and the protective layer 2 comprising the print 3, formed in b), the print 3 contacting the base layer 4, to form multilayer film structure 1;

d) thermoforming of the multilayer film structure 1 produced in c) to form a cavity structure;

e) sealing of the cavity structure realised in d) against itself or against another sealable multilayer structure.

In the process for preparing the single-serve portion pack, a) and b) may be performed simultaneous or separately wherein the order in which a) and b) are executed is insignificant.

The method for forming the multilayer film structure 1 may comprise an additional step of top-coating the protective layer either in b) or in c).

For thermoforming, the multilayer film sequence 1 is fed into a preheated oven and is then pressed into a mould at a forming station using pressure, plugs and vacuum. It is then cooled so that its new shape is maintained while it hardens.

The multilayer film 1 of the present disclosure allows the production of single-serve portion packs at a speed of at least 25 cycles/minute; in particular, the multilayer film allows for defect-free single-serve portion packs produced in a 40 cycles/minute and more process.

EXAMPLES

The following illustrative examples are merely meant to exemplify the present invention but they are not intended to limit or otherwise define the scope of the present disclosure.

Example 1

A multilayer film structure 1 with an overall thickness of 300 μm and with the below composition was produced and thermoformed to form a complex cavity as in FIG. 1: protective layer 2//print 3//adhesive layer 7//polystyrene base layer 4//adhesive layer 7//polyethylene outside lamination layer 8//tie layer 9//poly(ethylene vinyl alcohol) barrier layer 10//tie layer 9//polyethylene peelable layer 11, wherein:

the adhesive layer 7 is obtained from a solvent-based polyurethane adhesive;

the polystyrene base layer 4 is a blend of 80% by weight of high-impact polystyrene and 20% by weight of general purpose polystyrene;

the tie layer 9 is linear low-density polyethylene grafted with maleic anhydride;

the polyethylene peelable layer 11 is a blend of 85% by weight of low-density polyethylene and 15% by weight of poly-1-butylene;

the protective layer 2 has a thickness of 30 μm;

the peelable seal layer 5 has a thickness of 50 μm;

the print 3 is obtained from heliographic printing.

Examples 2 and 3-Comparative Examples 1 to 6

The protective layer 2 was selected among the polymers as represented in Column 2 of Table 1 below.

In this table, the stress at 20% strain, at 90° C., and the melting peak temperature are reproduced in Column 3 and 4, respectively.

TABLE 1

| Example | Protective polymer layer | Stress at 20% Strain (MPa) at 90° C. | Melting point (° C.) |
|---|---|---|---|
| 2 | diacid modified polyethylene terephthalate (*) | 13.5 | 200 |
| 3 | polybutylene terephthalate | 9.2 | 223 |
| Comp. 1 | oriented polyethylene terephthalate | 69.4 | 245 |
| Comp. 2 | oriented polyamide | 44 | 220 |
| Comp. 3 | oriented polypropylene | 30 | 163 |
| Comp. 4 | polyamide 6 | 28.4 | 225 |
| Comp. 5 | crystalline polypropylene | 3.9 | 163 |
| Comp. 6 | glycol modified polyethylene terephthalate | 0.9 | not applicable |

(*): the diacid modification is based on a mixture of isophthalic acid and 2,6-naphthalene dicarboxylic acid The multilayer films of Examples 2 and 3, having a protective layer 2 further characterized by a melt flow index (2.16 kg) at 250° C. of respectively 9 and 6.5 g/10 min. and an elastic modulus at 25° C. of respectively 3200 and 2500 MPa, were thermoformed into a complex structure as in FIG. 1, without showing any cracks or other defects and with an "in-register" print with homogeneous color fastness and intensity at the sharp edges of the structure. The multilayer films did not show any damage upon heat sealing.

The multilayer films of Comparative examples 1 to 4 were difficult to be thermoformed into a structure as in FIG. 1, showing cracks at the edges; the print was an "in-register" print. The multilayer films did not show any damage upon heat sealing.

The multilayer films of Comparative examples 5 and 6 were thermoformed into a structure as in FIG. 1, without showing any cracks or other defects; the print was an "out-of-register" print due to insufficient dimensional stability of the protective layers 2 during the printing process. The multilayer films were damaged upon heat sealing.

The invention claimed is:

1. A single-serve portion pack comprising:
a multilayer film structure, the multilayer film structure comprising a protective layer, a print, a base layer and a peelable seal layer, the print situated in-between the protective layer and the base layer;
wherein the protective layer is a polyalkylene terephthalate based layer having a stress value at 20% strain, comprised between 5 and 20 MPa, measured with a controlled stress dynamic mechanical analyzer at 90° C.

2. The single-serve portion pack according to claim 1, wherein the polyalkylene terephthalate has a melt flow index at 250° C., according to ISO 1133, using a piston actuated by a weight of 2.16 kg, comprised between 5 and 20 g/10 min.

3. The single-serve portion pack according to claim 1, wherein the polyalkylene terephthalate is selected from the group consisting of polybutylene terephthalate and diacid modified polyethylene terephthalate.

4. The single-serve portion pack according to claim 1, wherein
a peelable layer of the peelable seal layer comprises between 5,000 and 10,000 ppm of a release agent;
the release agent being a fatty acid ester of a polyhydric alcohol having at least one fatty acid ester radical per polyhydric alcohol, the fatty acid having 18 or more carbon atoms.

5. The single-serve portion pack according to claim 1, wherein the peelable seal layer comprises a release agent selected from the group consisting of glycerol monostearate, glycerol monobehenate, glycerol monolignocerate, glycerol monoarachinate, glycerol monocerotinate, and glycerol monooleate.

6. The single-serve portion pack according to claim 1, wherein the peelable seal layer comprises a barrier layer selected from the group consisting of poly(ethylene vinyl alcohol), polyvinyl alcohol, polyvinylidene chloride, polyamide, polyester, and combinations thereof.

7. The single-serve portion pack according to any of claim 1, wherein the base layer, comprises one or more polymer layer(s) selected from the group consisting of polyamide, polyester, polycarbonate, polyvinyl chloride, polypropylene, polyethylene, polystyrene, polyester-glycol copolymer, and ethylene vinyl acetate.

8. The single-serve portion pack according to claim 1, comprising an additional layer on top of the protective layer, on a side away from the print, the additional layer being a crosslinked coating layer.

9. The single-serve portion pack according to claim 1, wherein an overall thickness of multilayer film structure is at least 100 μm.

10. The single-serve portion pack according to claim 1, wherein a thickness of the protective layer is comprised between 5 and 60 μm.

11. The single-serve pack according to claim 1, wherein a thickness of the peelable seal layer is comprised between 20 and 80 μm.

12. The single-serve portion pack according to claim 1, wherein the polyalkylene terephthalate is selected from the group consisting of polybutylene terephthalate and diacid modified polyethylene terephthalate;
wherein the peelable seal layer comprises a release agent selected from the group consisting of glycerol monostearate, glycerol monobehenate, glycerol monolignocerate, glycerol monoarachinate, glycerol monocerotinate, and glycerol monooleate;

wherein the peelable seal layer comprises a barrier layer selected from the group consisting of poly(ethylene vinyl alcohol), polyvinyl alcohol, polyvinylidene chloride, polyamide, polyester, and combinations thereof; and wherein the base layer, comprises one or more polymer layer(s) selected from the group consisting of polyamide, polyester, polycarbonate, polyvinyl chloride, polypropylene, polyethylene, polystyrene, polyester-glycol copolymer, and ethylene vinyl acetate.

13. The single-serve portion pack according to claim 1, wherein the polyalkylene terephthalate has a melting peak temperature, measured by differential scanning calorimetry, according to ISO 11357, with a heating gradient of 10° C./min., comprised between 190 and 240° C.

14. The single-serve portion pack according to claim 13, comprising an additional layer on top of the protective layer, on a side away from the print, the additional layer being a crosslinked coating layer.

15. The single-serve portion pack according to claim 14, wherein an overall thickness of multilayer film structure is at least 100 μm.

16. The single-serve portion pack according to claim 15, wherein a thickness of the protective layer is comprised between 5 and 60 μm.

17. The single-serve pack according to claim 16, wherein a thickness of the peelable seal layer is comprised between 20 and 80 μm.

18. A method of manufacturing a single-serve portion pack having multilayer film structure, the multilayer film structure comprising a protective layer, a print, a base layer and a peelable seal layer, the print situated in-between the protective layer and the base layer; wherein the protective layer is a polyalkylene terephthalate based layer having a stress value at 20% strain, comprised between 5 and 20 MPa, measured with a controlled stress dynamic mechanical analyzer at 90° C., the method comprising the following steps:

a) coextrusion, extrusion lamination, or extrusion-coating, and/or lamination of the base layer, the peelable seal layer, optionally a gas-barrier layer, and one or more tie layer(s);

b) reverse-printing of the protective layer;

c) adhesive lamination of the structure comprising the base layer the peelable seal layer, the optional gas-barrier layer, and the one or more tie layer(s), formed in step a) and the protective layer comprising the print, formed in step b), the print contacting the base layer, to form the multilayer film structure;

d) thermoforming of the multilayer film structure produced in step c) to form a cavity structure;

e) sealing of the cavity structure, realized in step d), against itself or against another sealable multilayer structure;

the steps a) and b) being separate or simultaneous steps.

19. The method according to claim 18, wherein the reverse printing in step b) is heliographic printing.

20. A method of packaging goods, the method comprising:

packaging a soft cheese, a sauce, a soap, or a liquid product using a single-serve pack having multilayer film structure, the multilayer film structure comprising a protective layer, a print, a base layer and a peelable seal layer, the print situated in-between the protective layer and the base layer; wherein the protective layer is a polyalkylene terephthalate based layer having a stress value at 20% strain, comprised between 5 and 20 MPa, measured with a controlled stress dynamic mechanical analyzer at 90° C.

* * * * *